(12) United States Patent
Lin et al.

(10) Patent No.: US 9,402,201 B2
(45) Date of Patent: Jul. 26, 2016

(54) METHOD AND APPARATUS FOR STORING CODE BLOCK

(71) Applicant: CHINA ACADEMY OF TELECOMMUNICATIONS TECHNOLOGY, Beijing (CN)

(72) Inventors: Yanan Lin, Beijing (CN); Zukang Shen, Beijing (CN); Yu Ding, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 2 days.

(21) Appl. No.: 14/054,117

(22) Filed: Oct. 15, 2013

(65) Prior Publication Data
US 2014/0038665 A1 Feb. 6, 2014

Related U.S. Application Data

(63) Continuation of application No. PCT/CN2012/072956, filed on Mar. 23, 2012.

(30) Foreign Application Priority Data

Apr. 15, 2011 (CN) .......................... 2011 1 0095309

(51) Int. Cl.
*H04W 28/04* (2009.01)
*H04L 1/18* (2006.01)
*H04L 1/00* (2006.01)

(52) U.S. Cl.
CPC ................. *H04W 28/04* (2013.01); *H04L 1/18* (2013.01); *H04L 1/1819* (2013.01); *H04L 1/1835* (2013.01); *H04L 1/1864* (2013.01); *H04L 1/0067* (2013.01)

(58) Field of Classification Search
CPC ....... H04L 1/1819; H04L 1/18; H04L 1/0067; H04L 1/1835; H04W 28/04
USPC ......... 370/236, 310, 329, 335, 352; 455/550.1
See application file for complete search history.

(56) References Cited

U.S. PATENT DOCUMENTS

| | | |
|---|---|---|
| 2009/0055702 A1 | 2/2009 | Kim et al. |
| 2010/0146355 A1 | 6/2010 | Jiang et al. |
| 2010/0262886 A1 | 10/2010 | Ren |

FOREIGN PATENT DOCUMENTS

| | | |
|---|---|---|
| CN | 101043301 A | 9/2007 |
| CN | 101183875 A | 5/2008 |
| CN | 101282202 A | 10/2008 |

(Continued)

OTHER PUBLICATIONS

International Search Report for International Patent Application No. PCT/CN2012/072956, dated Jul. 5, 2012, and English translation thereof.
Extended European Search Report for Application No. 1277123.4 dated Oct. 7, 2014.

(Continued)

*Primary Examiner* — Sam Bhattacharya
(74) *Attorney, Agent, or Firm* — Harness, Dickey & Pierce, P.L.C.

(57) ABSTRACT

Various embodiments provide a method and apparatus for storing a code block. When the size of the buffer in the terminal device is smaller than the size of the buffer at the rate matching at the base station, the code block is stored in the buffer, which is used when the terminal device fails to decode the code block.

5 Claims, 7 Drawing Sheets

(56) References Cited

FOREIGN PATENT DOCUMENTS

| CN | 101286825 A | 10/2008 |
|---|---|---|
| CN | 101425878 A | 5/2009 |
| CN | 102255710 A | 11/2011 |

OTHER PUBLICATIONS

Chinese Office Action for Application No. 201110095309.X dated Jul. 26, 2013.
Chinese Office Action for Application No. 201110095309.X dated Jan. 11, 2013, and its English translation thereof.
Korean Office Action for Application No. 10-2013-7030124 dated Jul. 11, 2015, and its English translation thereof.

METHOD AND APPARATUS FOR STORING CODE BLOCK

CROSS-REFERENCE TO RELATED APPLICATIONS

This application is a continuation of International Patent Application No. PCT/CN2012/072956 filed on Mar. 23, 2012. This application claims the benefit and priority of Chinese Application No. 201110095309.X, filed Apr. 15, 2011. The entire disclosures of each of the above applications are incorporated herein by reference.

FIELD

The present disclosure relates to communication technologies and to a method and apparatus for storing a code block.

BACKGROUND

This section provides background information related to the present disclosure which is not necessarily prior art.

To support efficient and flexible transmission, a Long Term Evolution (LTE) release 8 (Rel-8) system needs to support various transmission modulation and coding schemes, including Hybrid Automatic Repeat reQuest (HARP) and link adaptation technologies.

The LTE system obtains a bit sequence with a predetermined length from an encoded bit stream, by puncture or repeating, and this procedure is called rate matching.

In the LTE system, the coding rate of a Turbo encoder used by the traffic channel is 1/3. System information, first parity information, and second parity information output by the Turbo encoder are interleaved respectively, then successively collected by a bit collecting unit.

Figure 1:
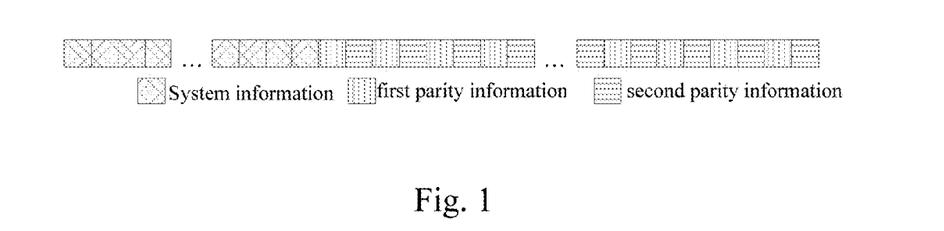
FIG. 1 is a schematic diagram illustrating a conventional rate matching buffer.

The interleaved system information is input to a buffer in turn, and then the interleaved first parity information and the interleaved second parity information are input to the buffer alternately, as shown in FIG. 1, which is a schematic diagram illustrating a conventional rate matching buffer.

Figure 2:
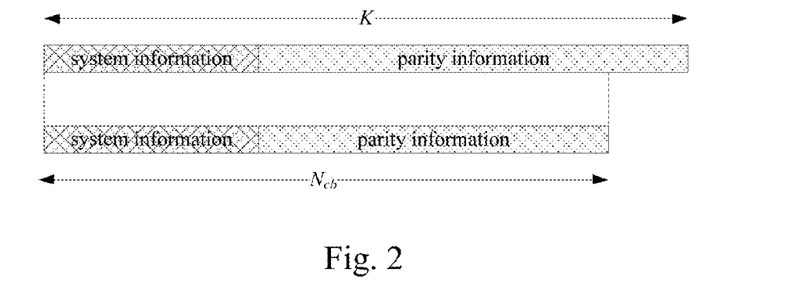
FIG. 2 is a schematic diagram illustrating shortened information in a conventional rate matching buffer.

To support terminals with different capabilities, information in a rate matching buffer shall be shortened, according to a buffer size reported by the terminal, before a base station, e.g. an eNB performs the rate matching for the terminal with lower capability. Total encoded information of a large transport block cannot be stored in the buffer of the terminal with lower capability. FIG. 2 is a schematic diagram illustrating shortened information in a conventional rate matching buffer.

K is a length of information output from the Turbo encoder, $$N_{cb} = \min\left(\left\lfloor \frac{N_{IR}}{C} \right\rfloor, K\right)$$

is a storage size corresponding to a Code block (CB), and the storage size is calculated according to the buffer size reported by the terminal.

C is the number of CBs divided from a Transport Block (TB).

$$N_{IR} = \left\lfloor \frac{N_{soft}}{K_{MIMO} \times \min(M_{DL-HARQ}, M_{limit})} \right\rfloor$$

In the above formula, $N_{soft}$ is the buffer size reported by the terminal. For the single-code transmission mode, $K_{MIMO}=1$. For the multi-code transmission mode, $K_{MIMO}=2$. $M_{DL-HARQ}$ is the maximum number of downlink HARQ processes. For Frequency Division Duplexing (FDD), $M_{DL-HARQ}=8$. For Time Division Duplexing (TDD), the value of $M_{DL-HARQ}$ is related to TDD uplink-downlink configuration. And $M_{limit}=8$.

Figure 3:
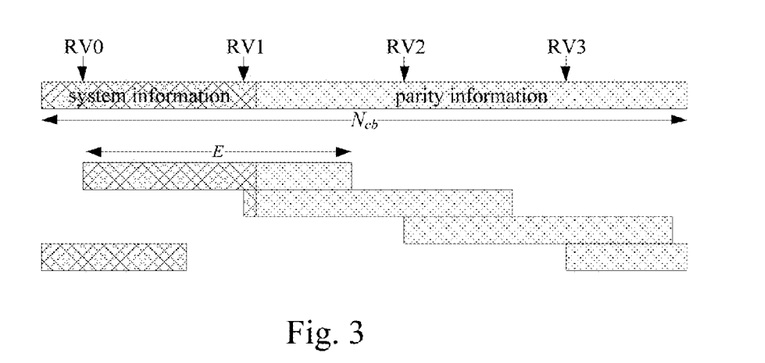
FIG. 3 is a schematic diagram illustrating a conventional redundancy version.

In the LTE system, four Redundancy Versions (RVs) are defined for HARQ retransmission, i.e. one CB corresponds to four starting bit positions for transmission. The four RVs are evenly distributed in the buffer, so as to initiate retransmission quickly. According to the RVs configured by the higher layer, a bit selecting unit in the terminal reads bit by bit from the buffer from the starting bit position corresponding to the RV, until the number of read bits reaches a preset value. When the number of read bits does not reach the preset value after a bit in the end of the buffer is read, the bit selecting unit automatically reads bits from the head of the buffer, as shown in FIG. 3. FIG. 3 is a schematic diagram illustrating a conventional redundancy version, where E is the transmission length of the CB.

Figure 4:
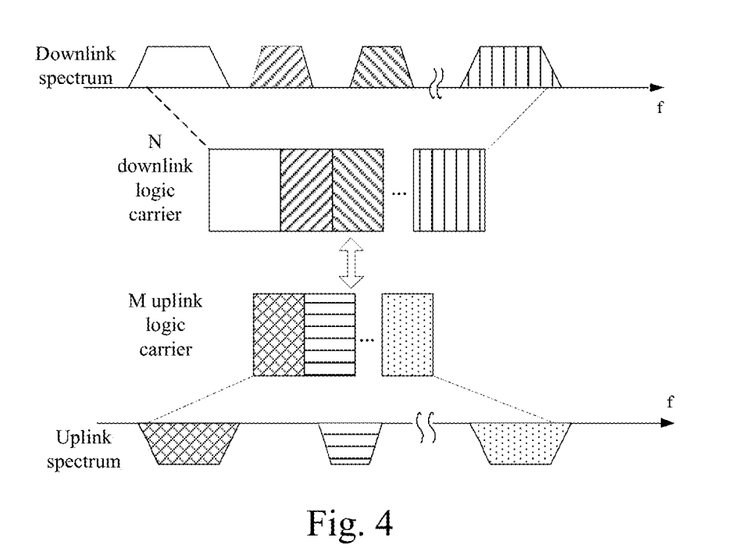
FIG. 4 is a schematic diagram illustrating a conventional carrier aggregation.

In a LTE Advanced (LTE-A) system, to support a wider system bandwidth than the LTE system, e.g. 100 MHz, carrier aggregation is proposed. For carrier aggregation, multiple existing spectrums are aggregated together to form a larger bandwidth. FIG. 4 shows the conventional carrier aggregation.

In current standards, each carrier has an independent HARQ process. In the single-code transmission mode, each process includes one TB; in the multi-code transmission mode, each process includes two TBs. One TB can be transmitted via only one carrier. When a base station and a User Equipment (UE) transmit data by multiple carriers, the different carriers transmit the different TBs respectively. When the HARQ function is used, a receiving end will store a decoding failure TB into the buffer, and decode the TB again after combining the TB with the version retransmitted by a sending end.

Currently, in the rate matching process of the LTE-A system, the base station and the terminal may have different buffer sizes.

The size of the CB in a rate matching buffer of the base station is $$N_{cb} = \min\left(\left\lfloor \frac{N_{IR}}{C} \right\rfloor, K\right),$$

where the parameters are the same as the above descriptions.

In the carrier aggregation system, the terminal needs to store more processes, thus the size of one CB in a storage buffer of the terminal is $N_{cb,UE} \leq N_{cb}$. However, the size of the CB in a rate de-matching buffer of the terminal is still $N_{cb}$, so as to correctly demodulate data.

The existing technologies at least have the following challenges.

Currently, no storage solution is provided when the size of the storage buffer in the terminal is smaller than the size of the rate matching buffer.

SUMMARY

This section provides a general summary of the disclosure, and is not a comprehensive disclosure of its full scope or all of its features.

Various embodiments provide a method and apparatus for storing a CB, so as to provide solutions used when the size of a storage buffer in the terminal device is smaller than the size of a rate matching buffer, and problems with lack of solutions are solved.

A method for storing a CB includes:

when failing to decode a CB sent by a base station, storing, by a terminal device, combined bit information of the CB according to an initial position of a Redundancy Version (RV) with a minimum index among received RVs corresponding to the CB.

A terminal device for storing a CB includes:

a decoding module, to decode a CB sent by a base station.

a storing module, when the decoding module fails to decode the CB, to store combined bit information of the CB according to an initial position of a RV with a minimum index among received RVs corresponding to the CB.

Compared with the existing technologies, various embodiments include the following advantages.

Various embodiments provide solutions that may be used when the size of the buffer in the terminal device is smaller than the size of the rate matching buffer at the base station. If the terminal device fails to decode the CB, the bits of the CB may be stored in the buffer by using various embodiments. Therefore, the solutions used when the size of the buffer in the terminal device is smaller than the size of the rate matching buffer are provided, and problems with lack of solutions are solved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In a conventional rate matching process of LTE-A systems, as described above, a buffer of a terminal device and a rate de-matching buffer at a base station may have different sizes, and no solution for storing CB data is provided.

Various embodiments provide a data transmission solution to solve the problem caused by differences between the size of the buffer in the terminal and the size of the rate de-matching buffer at the base station.

Figure 5:
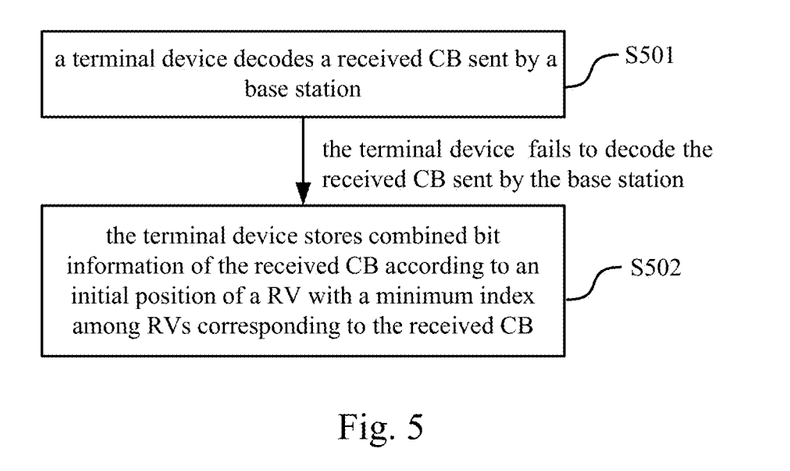
FIG. 5 is a schematic flowchart illustrating a method for storing a code block according to various embodiments.

FIG. 5 is a schematic flowchart illustrating a method for storing a code block according to various embodiments. As shown in FIG. 5, the method includes the following processing.

At block S501, a terminal device decodes a received CB sent by a base station.

At block S502, when failing to decode the received CB sent by the base station, the terminal device stores combined bit information of the received CB according to an initial position of a RV with a minimum index among received RVs corresponding to the received CB.

According to various embodiments, two cases are included in a storing procedure performed at block S502.

In the first case, the terminal device stores combined bit information corresponding to the received CB in a buffer by starting from the initial position of the RV with the minimum index among the received RVs corresponding to the received CB and according to a bit position sequence in a rate matching at the base station.

In this case, positions used for storing the bit information of the CB in the buffer of the terminal device correspond to positions used for transmitting the CB respectively in the rate matching at the base station. The initial position in the buffer of the terminal device is the initial position of the RV with the minimum index among RVs corresponding to the received CB.

If the terminal device identifies that the bit information to be stored is null in the procedure of storing the combined bit information corresponding to the CB, the terminal device sets positions corresponding to the bit information in the buffer as null.

In the second case, the terminal device stores combined bit information corresponding to the received CB in a buffer by starting from the initial position of the RV with the minimum index among received RVs corresponding to the received CB and according to an ascending bit order in a rate matching at the base station.

In this case, the buffer in the terminal device stores bits of the CB by taking the initial position of the RV with the minimum index among received RVs corresponding to the received CB as an initial position. In the procedure of storing the combined bit information corresponding to the CB, when the bit information to be stored is identified as null, the terminal device takes a subsequent bit as the bit information to be stored in turn until the bit information to be stored is not null, and stores the bit information to be stored. Therefore, the positions finally used for storing the bit information of the CB in the buffer of the terminal device may not correspond to the actual transmission positions of the CB in the rate matching at the base station. In this way, the storage resources are utilized more effectively.

Various embodiments may be used when the size of the buffer in the terminal device is smaller than the size of the rate matching buffer at the base station. If the terminal device fails to decode the CB, the bits of the CB may be stored in the buffer by using various embodiments. Therefore, in various embodiments, the system may be advantageous when the size of the buffer in the terminal device is smaller than the size of the rate matching buffer are provided.

The various embodiments will be described in detailed in combination with application scenarios.

Various embodiments provide a method for storing a CB in a carrier aggregation system.

$N_{cb,eNB}$ is the size of a buffer corresponding to a CB at a base station, i.e., the size of the CB in a rate matching and a rate de-matching.

$N_{cb,UE}$ is the size of a buffer corresponding to a CB at a terminal device, and $N_{cb,UE} \leq N_{cb,eNB}$.

$E_x$ is a transmission length used when the base station transmits the CB to the terminal device at the $X^{th}$ times.

When the terminal device fails to decode the CB, the terminal device stores combined bit information of $N_{cb,UE}$ bits according to an initial position of a RV with a minimum index among received RVs corresponding to the CB.

Two modes are provided by various embodiments based on different storage positions.

In the first mode, the bit information is stored in turn according to bit positions in the rate matching at the base station.

In detailed application scenarios, the methods provided by various embodiments include two cases according to whether the size of the each CB transmitted by the base station is larger than the size of the buffer corresponding to the CB in the terminal device.

In the first case, the size of the CB transmitted by the base station is smaller than the size of the buffer corresponding to the CB in the terminal device.

Figure 6:
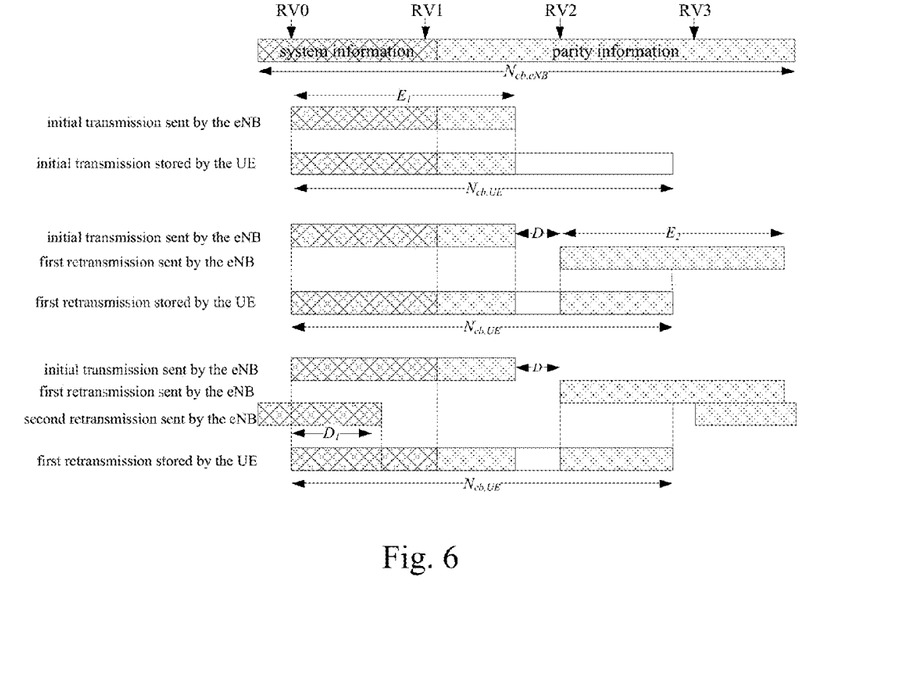
FIG. 6 is a schematic flowchart illustrating a method for storing a code block in a first case of a first mode according to various embodiments.

FIG. 6 is a schematic flowchart illustrating a method for storing a code block in a first case of a first mode according to various embodiments.

For the same CB, the base station sends RV0 for an initial transmission, sends RV2 for the first retransmission, sends RV3 for the second retransmission and sends RV1 for the third retransmission.

As shown in FIG. 6, $E_1 \leq N_{cb,UE}$, the interval between the initial bit of RV0 and the initial bit of RV2 is $E_1+D$, D>0.

After the terminal device receives the initial transmission RV0, if the terminal device fails to decode the CB, the terminal device stores information into the buffer by starting from the initial bit of RV0 and according to the bit position sequence in the rate matching at the base station. $0\sim(E_1-1)$ bits in the buffer of the terminal device correspond to $E_1$ bits of RV0.

After the terminal device receives the first retransmission RV2, if the terminal device fails to decode the CB, since transmission of RV0 and RV2 are received and RV0 has the minimum index, the terminal device stores combined information into the buffer by starting from the initial bit of RV0 and according to the bit position sequence in the rate matching at the base station. $0\sim(E_1-1)$ bits in the buffer of the terminal device correspond to $E_1$ bits of RV0, $E_1\sim(E_1+D-1)$ bits are null, and $(E_1+D)\sim(N_{cb,UE}-1)$ bits correspond to $N_{cb,UE}-E_1-D$ bits of RV2.

After the terminal device receives the second retransmission RV3, if the terminal device fails to decode the CB, since transmission of RV0, RV2 and RV3 are received and RV0 has the minimum index, the terminal device stores combined information into the buffer by starting from the initial bit of RV0 and according to the bit position sequence in the rate matching at the base station. $0\sim(D_1-1)$ bits in the buffer of the terminal device correspond to $D_1$ bits of combined information of overlap between RV0 and RV3, $D_1\sim(E_1-1)$ bits correspond to $E_1-D_1$ bits at the end of RV0, and $(E_1+D)\sim(N_{cb,UE}-1)$ bits correspond to $N_{cb,UE}-E_1-D$ bits of RV2.

After the terminal device receives the third retransmission RV1, if the terminal device fails to decode the CB, since transmission of RV0, RV2, RV3 and RV1 are received and RV0 has the minimum index, the terminal device stores combined information into the buffer by starting from the initial bit of RV0 and according to the bit position sequence in the rate matching at the base station. Detailed storage principle may refer to the above descriptions. The combined information is stored in the buffer.

If multiple times of retransmission are supported, similar processing may be performed and will not be described herein.

In addition, it should be noted that, in the above processing scene, RV0 has the minimum index and is the initial transmission. If the RV transmitted initially does not have the minimum index, the processing is shown in FIG. 7.

For the same CB, the base station sends RV2 for an initial transmission, sends RV0 for the first retransmission, sends RV3 for the second retransmission and sends RV1 for the third retransmission.

Figure 7:
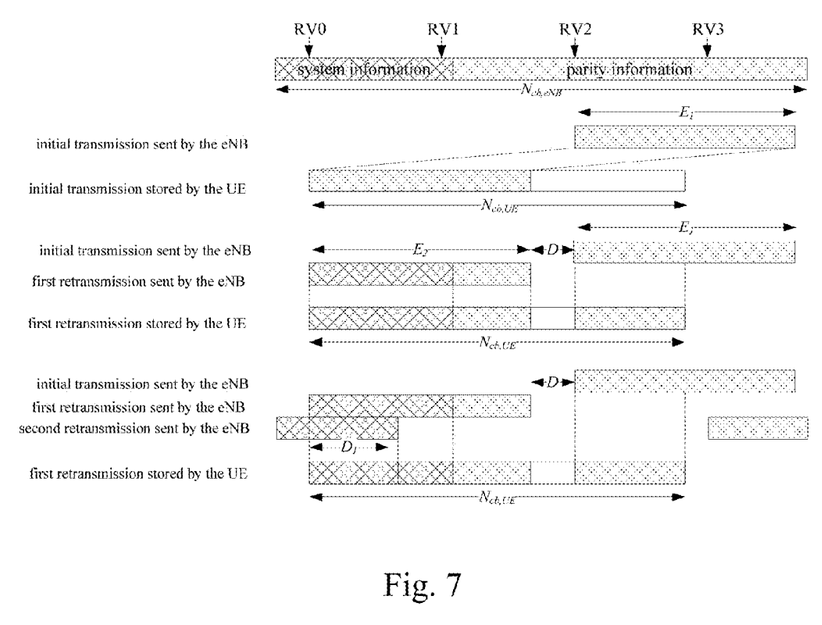
FIG. 7 is a schematic flowchart illustrating a method for storing a code block in a first case of a first mode according to various embodiments.

As shown in FIG. 7, $E_1 \leq N_{cb,UE}$, the interval between an initial bit of RV0 and an initial bit of RV2 is $E_2+D$, D>0.

After the terminal device receives the initial transmission RV2, if the terminal device fails to decode the CB, the terminal device stores information into the buffer by starting from the initial bit of RV2 and according to the bit position sequence in the rate matching at the base station. $0\sim(E_1-1)$ bits in the buffer of the terminal device correspond to $E_1$ bits of RV2.

After the terminal device receives the first retransmission RV0, if the terminal device fails to decode the CB, since transmission of RV2 and RV0 are received and RV0 has the minimum index, the terminal device stores combined information into the buffer by starting from the initial bit of RV0 and according to the bit position sequence in the rate matching at the base station. $0\sim(E_2-1)$ bits in the buffer of the terminal device correspond to $E_2$ bits of RV0, $E_2\sim(E_2+D-1)$ bits are null, and $(E_2+D)\sim(N_{cb,UE}-1)$ bits correspond to $N_{cb,UE}-E_2-D$ bits of RV2.

After the terminal device receives the second retransmission RV3, if the terminal device fails to decode the CB, since transmission of RV2, RV0 and RV3 are received, and RV0 has the minimum index, the terminal device stores combined information into the buffer by starting from the initial bit of RV0 and according to the bit position sequence in the rate matching at the base station. $0\sim(D_1-1)$ bits in the buffer of the terminal device correspond to $D_1$ bits of combined information of overlap between RV0 and RV3, $D_1\sim(E_1-1)$ bits correspond to $E_1-D_1$ bits at the end of RV0, and $(E_1+D)\sim(N_{cb,UE}-1)$ bits correspond to $N_{cb,UE}-E_1-D$ bits of RV2.

After the terminal device receives the third retransmission RV1, if the terminal device fails to decode the CB, since transmission of RV2, RV0, RV3 and RV1 are received and RV0 has the minimum index, the terminal device stores combined information into the buffer by starting from the initial bit of RV0 and according to the bit position sequence in the rate matching at the base station. Detailed storage principle may refer to the above descriptions. The combined information is stored in the buffer.

If multiple times of retransmission are supported, similar processing may be performed and will not be described herein.

In the second case, the size of the CB transmitted by the base station is larger than the size of the buffer corresponding to the CB in the terminal device.

Figure 8:
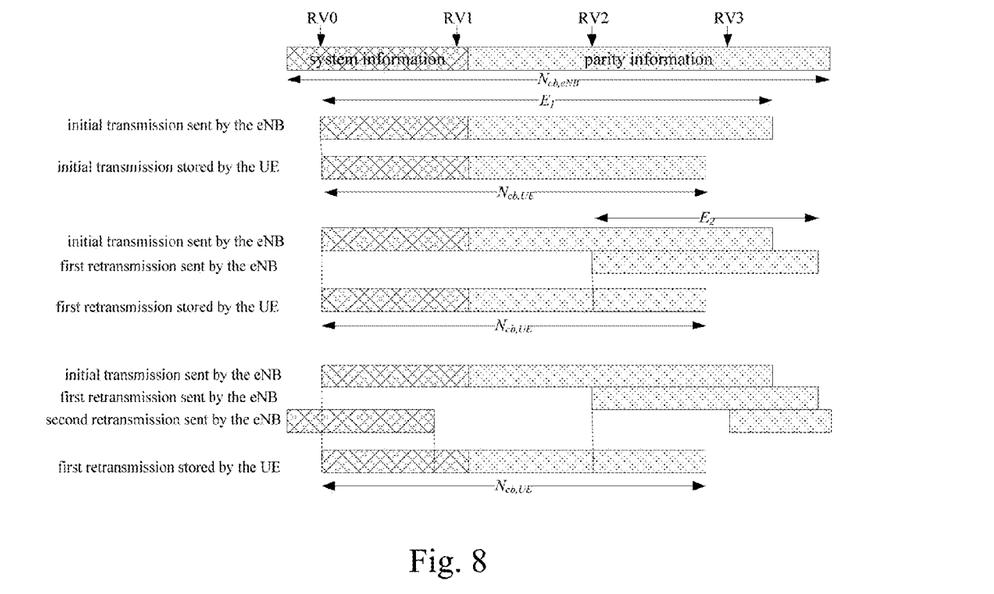
FIG. 8 is a schematic flowchart illustrating a method for storing a code block in a second case of a first mode according to various embodiments.

FIG. 8 is a schematic flowchart illustrating a method for storing a code block in a second case of a first mode according to various embodiments.

As shown in FIG. 8, $E_1 > N_{cb,UE}$ in the second case differs from the first case in that after the terminal device receives the initial transmission, if the terminal device fails to decode the CB, the terminal device stores information into the buffer starting from the initial bit of RV0 and according to the bit position sequence in the rate matching at the base station. $0 \sim (N_{cb,UE}-1)$ bits in the buffer of the terminal device correspond to $N_{cb,UE}$ bits in the front of RV0, and other bits are not stored.

In the second mode, the bit information is stored according to an ascending bit order in the rate matching at the base station.

In detailed application scenes, the methods provided by various embodiments include two cases according to whether the size of the each CB transmitted by the base station is larger than the size of the buffer corresponding to the CB in the terminal device.

In the first case, the size of the CB transmitted by the base station is smaller than the size of the buffer corresponding to the CB in the terminal device.

Figure 9:
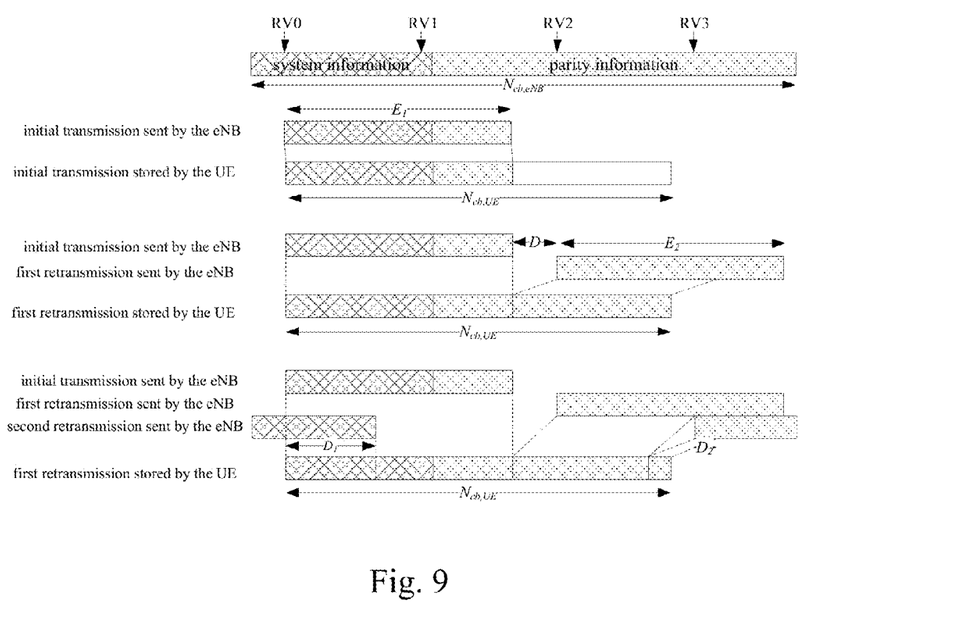
FIG. 9 is a schematic flowchart illustrating a method for storing a code block in a first case of a second mode according to various embodiments.

FIG. 9 is a schematic flowchart illustrating a method for storing a code block in a first case of a second mode according to various embodiments.

For the same CB, the base station sends RV0 for an initial transmission, sends RV2 for the first retransmission, sends RV3 for the second retransmission, and sends RV1 for the third retransmission. The interval between an initial bit of RV0 and an initial bit of RV2 is $E_1+D$, $D>0$, $E_1 \leq N_{cb,UE}$.

After the terminal device receives the initial transmission RV0, if the terminal device fails to decode the CB the terminal device stores information into the buffer by starting from the initial bit of RV0 and according to an ascending bit order in the rate matching at the base station. $0 \sim (E_1-1)$ bits in the buffer of the terminal device correspond to $E_1$ bits of RV0.

After the terminal device receives the first retransmission RV2, if the terminal device fails to decode the CB, since transmission of RV0 and RV2 are received and RV0 has the minimum index, the terminal device stores combined information into the buffer by starting from the initial bit of RV0 and according to the ascending bit order in the rate matching at the base station. $0 \sim (E_1-1)$ bits in the buffer of the terminal device correspond to $E_1$ bits of RV0, and $E_1 \sim (N_{cb,UE}-1)$ bits correspond to $N_{cb,UE}-E_1$ bits of RV2.

After the terminal device receives the second retransmission RV3, if the terminal device fails to decode the CB, since transmission of RV0, RV2, and RV3 are received and RV0 has the minimum index, the terminal device stores combined information into the buffer by starting from the initial bit of RV0 and according to the ascending bit order in the rate matching at the base station. $0 \sim (D_1-1)$ bits in the buffer of the terminal device correspond to $D_1$ bits of combined information of overlap between RV0 and RV3, $D_1 \sim (E_1-1)$ bits correspond to $E_1-D_1$ bits at the end of RV0, $E_1 \sim (N_{cb,UE}-D_2-1)$ bits correspond to $N_{cb,UE}-E_1-D_1$ bits of RV2, and $(N_{cb,UE}-D_2) \sim (N_{cb,UE}-1)$ correspond to $D_2$ bits of combined information of overlap between RV2 and RV3.

After the terminal device receives the third retransmission RV1, if the terminal device fails to decode the CB, since transmission of RV0, RV2, RV3, and RV1 are received and RV0 has the minimum index, the terminal device stores combined information into the buffer by starting from the initial bit of RV0 and according to the ascending bit order in the rate matching at the base station. Detailed storage principle may refer to the above descriptions. The combined information is stored in the buffer.

If multiple times of retransmission are supported, similar processing may be performed and will not be described herein.

Figure 10:
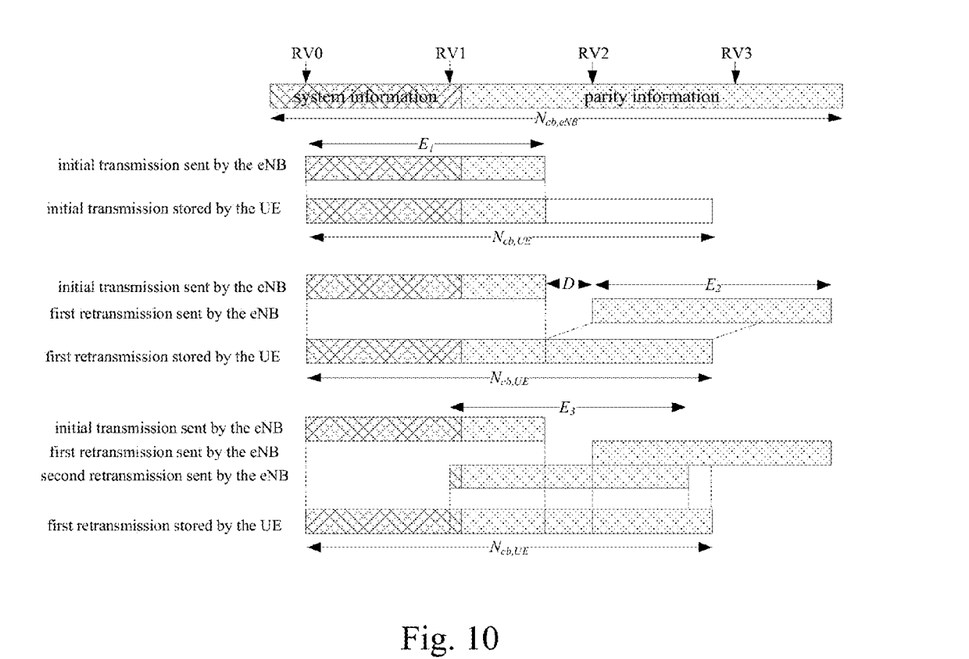
FIG. 10 is a schematic flowchart illustrating a method for storing a code block in a first case of a second mode according to various embodiments.

In addition, it should be noted that, as shown in FIG. 10, the base station sends RV0 for the initial transmission, sends RV2 for the first retransmission, sends RV1 for the second retransmission, and sends RV3 for the third retransmission. The interval between the initial bit of RV0 and an initial bit of RV2 is E1+D, D>0.

After the terminal device receives the initial transmission RV0, if the terminal device fails to decode the CB, the terminal device stores information into the buffer by starting from the initial bit of RV0 and according to an ascending bit order in the rate matching at the base station. $0 \sim (E_1-1)$ bits in the buffer of the terminal device correspond to $E_1$ bits of RV0.

After the terminal device receives the first retransmission RV2, if the terminal device fails to decode the CB, since transmission of RV0 and RV2 are received and RV0 has the minimum index, the terminal device stores combined information into the buffer by starting from the initial bit of RV0 and according to the ascending bit order in the rate matching at the base station. $0 \sim (E_1-1)$ bits in the buffer of the terminal device correspond to $E_1$ bits of RV0, and $E_1 \sim (N_{cb,UE}-1)$ bits correspond to $N_{cb,UE}-E_1$ bits of RV2.

After the terminal device receives the second retransmission RV1, if the terminal device fails to decode the CB, since transmission of RV0, RV2, and RV1 are received and RV0 has the minimum index, the terminal device stores combined information into the buffer by starting from the initial bit of RV0 and according to the ascending bit order in the rate matching at the base station. This differs from the case shown in FIG. 9, since RV1 is sent in the second retransmission, and $N_{cb,UE}-E-D$ bits of RV2 can be stored, rather than $N_{cb,UE}-E_1$.

After the terminal device receives the third retransmission RV3, if the terminal device fails to decode the CB, since transmission of RV2, RV0, RV1, and RV3 are received and RV0 has the minimum index, the terminal device stores combined information into the buffer starting from the initial bit of RV0 and according to the ascending bit order in the rate matching at the base station. Detailed storage principle may refer to the above descriptions. The combined information is stored in the buffer.

If multiple times of retransmission are supported, similar processing may be performed and will not be described herein.

In addition, in the above processing scene, RV0 has the minimum index and is transmitted initially. If the number of the RV transmitted initially does not have the minimum index, the processing is shown in FIG. 7 and will not be described herein.

In the second case, the size of the CB transmitted by the base station is larger than the size of the buffer corresponding to the CB in the terminal device.

The detailed processing is the same as the second case in the first mode, and will not be described herein.

The existing technologies compare with the various embodiments in at least the following ways.

Various embodiments may be used when the size of the buffer in the terminal device is smaller than the size of the buffer of the rate matching at the base station. If the terminal device fails to decode the CB, the bits of the CB may be stored in the buffer by using various embodiments. Therefore, the various embodiments may be used when the size of the buffer in the terminal device is smaller than the size of the buffer of the rate matching.

Figure 11:
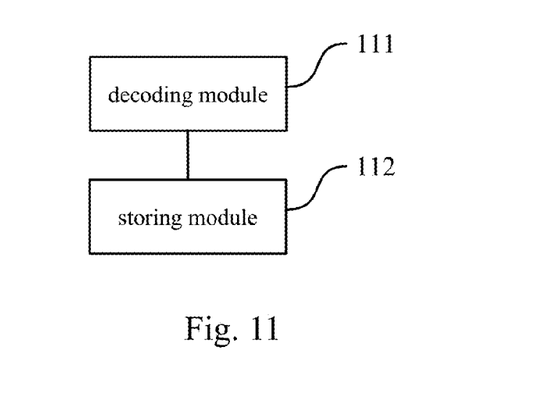
FIG. 11 is a schematic diagram illustrating a terminal device according to various embodiments.

Various embodiments also provide a terminal device. As shown in FIG. 11, the terminal device includes a decoding module 111 and a storing module 112.

The decoding module 111 decodes a received CB sent by a base station.

The storing module 112, when the decoding module fails to decode the received CB sent by the base station, stores combined bit information of the CB according to an initial position of a RV with a minimum index among received RVs corresponding to the CB.

According to various embodiments, the storing module 112 further stores combined bit information corresponding to the CB in a buffer by starting from a position corresponding to the initial position of the RV with the minimum index among received RVs corresponding to the CB and according to a bit position sequence in a rate matching at the base station.

In this case, the storing module 112 further determines that the bit information to be stored currently is null in the procedure of storing the combined bit information corresponding to the CB, and configures positions corresponding to the bit information in the buffer as null.

According various embodiments, the storing module 112 further stores combined bit information corresponding to the CB in a buffer by starting from a position corresponding to the initial position of the RV with the minimum index among received RVs corresponding to the CB and according to an ascending bit order in a rate matching at the base station.

In this case, the storing module 112 further determines that the bit information to be stored currently is null in the procedure of storing the combined bit information corresponding to the CB, takes a subsequent bit as the bit information to be stored in turn until the bit information to be stored is not null, and stores the bit information to be stored.

Compared with the existing technologies, various embodiments include the following advantages.

Various embodiments may be used when the size of the buffer in the terminal device is smaller than the size of the buffer of the rate matching at the base station. If the terminal device fails to decode the CB, the bits of the CB may be stored in the buffer by using various embodiments. Therefore, the various embodiments may be used when the size of the buffer in the terminal device is smaller than the size of the buffer of the rate matching.

One skilled in the art would recognize that the present invention can be realized by software accompanying with necessary general hardware platforms, or by hardware. Based on this, the essential part of the technical solution or the part contributed to the prior art can be in the form of a software product, and the computer software product is stored in a storage medium (such as a CD-ROM, a U disk, a Mobile Hard disk) and includes several codes to make a computer device (such as a personal computer, a server or a network device) perform the method in various embodiments.

One with ordinary skill in the art may easily recognize that the accompanying drawings are only schematic diagrams of a preferred embodiment. The modules or processes illustrated in the accompanying drawings are not definitely necessary to implement the present invention.

One with ordinary skill in the art may recognize that the modules in the various embodiments may be distributed in the device of the embodiment according to embodiment descriptions, or may change correspondingly to locate in one or more devices different from the embodiment. The modules in the above embodiment may also be merged into one module, or may be divided into multiple sub-modules.

Sequence numbers in above embodiments are only used for descriptions, and doesn't demonstrate a good or better embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for storing a code block (CB), comprising:
when failing to decode a CB sent by a base station,
determining, by a terminal device, a Redundancy Version (RV) which has a minimum index among at least one received RV corresponding to the CB;
determining, by the terminal device, an initial bit position of the determined RV:
storing, by the terminal device, combined bit information of the at least one received RV corresponding to the CB according to the initial bit position.

2. The method of claim 1, wherein storing, by the terminal device, the combined bit information of at least one received RV corresponding to the CB according to the initial bit position comprises:
storing, by the terminal device, the combined bit information of at least one received RV corresponding to the CB in a buffer by starting from the initial bit position of the RV which has the minimum index among the at least one received RV corresponding to the CB, and according to a bit position sequence in a rate matching at the base station.

3. The method of claim 2, wherein storing, by the terminal device, the combined bit information of at least one received RV corresponding to the CB in the buffer according to the bit position sequence in the rate matching at the base station comprises:
if the terminal device identifies that bit information to be stored is null when storing the combined bit information of at least one received RV corresponding to the CB,
setting, by the terminal device, a position corresponding to the bit information to be stored in the buffer as null.

4. The method of claim 1, wherein storing, by the terminal device, the combined bit information of at least one received RV corresponding to the CB according to the initial bit position comprises:
storing, by the terminal device, the combined bit information of at least one received RV corresponding to the CB in a buffer by starting from the initial bit position of the RV which has the minimum index among the at least one received RV corresponding to the CB, and according to an ascending bit order in a rate matching at the base station.

5. The method of claim 4, wherein storing, by the terminal device, the combined bit information of at least one received RV corresponding to the CB in the buffer according to the ascending bit order in the rate matching at the base station comprises:

if the terminal device identifies that bit information to be stored is null when storing the combined bit information of at least one received RV corresponding to the CB,     taking, by the terminal device, a subsequent bit as the bit information to be stored until the bit information to be stored is not null, and storing the bit information.

\* \* \* \* \*